(12) United States Patent
Lee et al.

(10) Patent No.: US 6,461,108 B1
(45) Date of Patent: Oct. 8, 2002

(54) COOLED THERMAL BARRIER COATING ON A TURBINE BLADE TIP

(75) Inventors: Ching-Pang Lee; Robert Edward Schafrik, both of Cincinnati; Ramgopal Darolia, West Chester, all of OH (US)

(73) Assignee: General Electric Company, Schenectady, NY (US)

( * ) Notice: Subject to any disclaimer, the term of this patent is extended or adjusted under 35 U.S.C. 154(b) by 7 days.

(21) Appl. No.: 09/818,384

(22) Filed: Mar. 27, 2001

(51) Int. Cl.[7] .................................................. F01D 5/18
(52) U.S. Cl. ................................ 416/96 R; 416/241 R; 29/889.1
(58) Field of Search .............................. 416/97 A, 97 R, 416/92, 231 R, 241 A, 241 B, 224; 415/173.4, 115; 29/889.1, 899.72, 889.721; 427/454, 142

(56) References Cited

U.S. PATENT DOCUMENTS 6,224,337 B1 * 5/2001 Lieland et al. ............ 415/173.4

* cited by examiner

Primary Examiner—Edward K. Look
Assistant Examiner—Kimya N McCoy

(74) Attorney, Agent, or Firm—David Narciso; McNess Wallace & Nurick; Carmen Santa Maria

(57) ABSTRACT

A cooling system for cooling of the squealer tip surface region of a high pressure turbine blade used in a gas turbine engine and a method for making a system for cooling of the squealer tip surface region of a high pressure turbine blade used in a gas turbine engine. The method comprises the steps of channeling apertures in a tip cap to a diameter of about 0.004" to about 0.020" to allow passage of cooling fluid from a cooling fluid source; applying a bond coat of about 0.0005" to about 0.010" in thickness to the tip cap such that the bond coat partially fills the channels; applying a porous TBC layer of at least about 0.003" in thickness to the bond coat, such that the porous TBC fills the channels; applying a dense ceramic TBC layer over the porous layer; and, passing cooling fluid from a cooling fluid source through the channel into the porous TBC. The density of the dense TBC layer can be varied as needed to achieve desired cooling objectives. Because the channel exit is filled with porous TBC material, cooling fluid flows through the porous passageways in the porous TBC layer into the squealer tip. Although the passageways provide a plurality of tortuous routes, the increased density of the TBC in the dense ceramic layer provides a resistance to flow of the cooling fluid and effectively causes the cooling fluid to more efficiently spread through the TBC into the squealer tip before exiting into the gas stream at the outer surface.

22 Claims, 2 Drawing Sheets

COOLED THERMAL BARRIER COATING ON A TURBINE BLADE TIP

CROSS-REFERENCE TO RELATED APPLICATIONS

This application references co-pending applications assigned to the assignee of the present invention, which are identified as Ser. No. 09/707,024 entitled "Multi-layer Thermal Barrier Coating with Integrated Cooling System", and Ser. No. 09/707,027 entitled "Transpiration Cooling in Thermal Barrier Coating", the contents of which are incorporated herein by reference.

FIELD OF THE INVENTION

This invention relates generally to gas turbine engines, and in particular, to a cooled flow path surface region of a turbine blade tip.

BACKGROUND OF THE INVENTION

In gas turbine engines, for example, aircraft engines, air is drawn into the front of the engine, compressed by a shaft-mounted rotary-type compressor, and mixed with fuel. The mixture is burned, and the hot exhaust gases are passed through a turbine mounted on a shaft. The flow of gas turns the turbine, which turns the shaft and drives the compressor and fan. The hot exhaust gases flow from the back of the engine, driving it and the aircraft forward.

During operation of gas turbine engines, the temperatures of combustion gases may exceed 3,000° F., considerably higher than the melting temperatures of the metal parts of the engine, which are in contact with these gases. Operation of these engines at gas temperatures that are above the melting temperatures of the metal components is a well established art, and depends in part on supplying a cooling air to the outer surfaces of the metal parts through various methods. The metal parts of these engines that are particularly subject to high temperatures, and thus require particular attention with respect to cooling, are metal parts forming combustors and parts located aft of the combustor including turbine blades, turbine vanes and exhaust nozzles.

The hotter the turbine inlet gases, the more efficient is the operation of the jet engine. There is thus an incentive to raise the turbine inlet gas temperature. However, the maximum temperature of the turbine inlet gases is normally limited by the materials used to fabricate the turbine vanes and turbine blades of the turbine. In current engines, the turbine vanes and blades are made of nickel-based superalloys, and can operate at metal surface temperatures of up to 2100°–2200° F.

The metal temperatures can be maintained below melting levels with current cooling techniques by using a combination of improved cooling designs and insulating thermal barrier coatings (TBCs). For example, with regard to the metal blades and vanes employed in aircraft engines, some cooling is achieved through convection by providing passages for flow of cooling air internally within the blades so that heat may be removed from the metal structure of the blade by the cooling air. Such blades essentially have intricate serpentine passageways within structural metal forming the cooling circuits of the blade.

Small internal orifices have also been devised to direct this circulating cooling air directly against certain inner surfaces of the airfoil to obtain cooling of the inner surface by impingement of the cooling air against the surface, a process known as impingement cooling. In addition, an array of small holes extending from the hollow core through the blade shell can provide for bleeding cooling air through the blade shell to the outer surface where a film of such air can protect the blade from direct contact with the hot gases passing through the engines, a process known as film cooling.

In another approach, a TBC is applied to the turbine blade component, which forms an interface between the metallic component and the hot gases of combustion. The TBC includes a ceramic coating that is applied to the external surface of metal parts within engines to impede the transfer of heat from hot combustion gases to the metal parts, thus insulating the component from the hot combustion gas. This permits the combustion gas to be hotter than would otherwise be possible with the particular material and fabrication process of the component. TBCs have also been used in combination with film cooling techniques wherein an array of fine holes extends from the hollow core through the TBC to provide cooling air onto the outer surface of the TBC.

Certain designs of airfoil tips utilize film cooling techniques. Film cooling is achieved by passing cooling air through discrete film cooling holes, typically ranging from 0.015" to about 0.030" in hole diameters. The film cooling holes are typically drilled with laser or EDM or ES machining. Due to mechanical limitations, each film hole has an angle ranging from 20° to 90° relative to the external surface. Therefore, each film jet exits from the hole with a velocity component perpendicular to the surface. Because of this vertical velocity component and a complex aerodynamic flow circulation near the tip of a turbine blade, commonly referred to as the "squealer tip", each film jet will have a tendency to lift or blow off from the external surface and mix with the hot exhaust gases, resulting in poor film cooling effectiveness in the area surrounding the squealer tip.

TBCs are well-known ceramic coatings, for example, yttrium-stabilized zirconia (YSZ). Ceramic TBCs usually do not adhere well directly to the superalloys used in the substrates. Therefore, an additional metallic layer called a bond coat is placed between the substrate and the thermal barrier coating. The bond coat may be made of a nickel-containing overlay alloy, such as a MCrAlX, or other compositions more resistant to environmental damage than the substrate, or alternatively, the bond coat may be a diffusion nickel aluminide or platinum aluminide, whose surface oxidizes to a protective aluminum oxide scale that provides improved adherence to the ceramic top coatings. The bond coat and the overlying TBC are frequently referred to as a thermal barrier coating system.

Multi layer coatings are known in the art. For example, U.S. Pat. No. 5,846,605 to Rickerby et al. is directed to a coating having a plurality of alternate layers having different structures that produce a plurality of interfaces. The interfaces provide paths of increased resistance to heat transfer to reduce thermal conductivity. A bond coat overlying a metallic substrate is bonded to a TBC. The TBC comprises a plurality of layers, each layer having columnar grains, the columnar grains in each layer extending substantially perpendicular to the interface between the bond coat and metallic substrate. The structure is columnar to ensure that the strain tolerance of the ceramic TBC is not impaired. The difference in structure of the layers is the result of variations in the microstructure and/or density/coarseness of the columnar grains of the ceramic.

U.S. Pat. No. 5,705,231 to Nissley et al. is directed to a segmented abradable ceramic coating system having enhanced abradability and erosion resistance. A segmented abradable ceramic coating is applied to a bond coat comprising three ceramic layers that are individually applied. There is a base coat foundation layer, a graded interlayer, and an abradable top layer. The coating is characterized by a plurality of vertical microcracks.

U.S. Pat. No. 4,503,130 to Bosshart et al. is directed to coatings having a low stress to strength ratio across the depth of the coating. Graded layers of metal/ceramic material having increasing ceramic composition are sequentially applied to the metal substrate under conditions of varied substrate temperature. Excessive stresses induced by differential strains between the layers is avoided. The effect of substrate temperature control and the differing coefficients of thermal expansion between materials of successive layers are matched to achieve the desired result.

U.S. Pat. No. 6,045,928 to Tsantrizos et al. is directed to a TBC comprising an MCrAlY bond coat and a dual constituent ceramic topcoat. The topcoat comprises a monolithic zirconia layer adjacent to the bond coat, a monolithic layer of calcia-silica representing the outer surface of the TBC and a graded interface between the two to achieve good adhesion between the two constituents to achieve an increased thickness of the topcoat, thereby, providing for a greater temperature drop across the TBC system. As used by Tsantrizos et al., monolithic refers to a uniform composition of a layer, while a graded interface refers to a layer having a changing composition from one monolithic composition to the other monolithic composition.

U.S. Pat. No. 4,576,874 to Spengler et al. is directed to a coating to increase resistance to spalling and corrosion. The coating is not intended to be a thermal barrier coating. A porous ceramic is applied over a MCrAlY bond coat and a dense ceramic is then applied over the porous ceramic. The porous portion is a transition zone to allow for differences in thermal expansion and provides little thermal insulation.

Improved environmental resistance to destructive oxidation and hot corrosion is desirable. In addition, the alloying elements of the bond coat interdiffuse with the substrate alloy, changing the composition of the protective outer layer so that the walls of the turbine airfoils are consumed. This loss of material reduces the load carrying capability of the airfoil, thereby limiting blade life. This interdiffusion can also reduce environmental resistance of the coating. This interdiffusion and its adverse effects can be reduced by controlling the temperature of the component in the region of the bond coat/substrate interface.

Thus, there is an ongoing need for an improved thermal barrier coating system, especially surrounding the squealer tip, wherein the environmental resistance and long-term stability of the thermal barrier coating system is improved so that higher engine efficiencies can be achieved. The bond coat temperature limit is critical to the TBC's life and has had an upper limit of about 2100° F. Once the bond coat exceeds this temperature, the coating system will quickly deteriorate, due to high temperature mechanical deformation and oxidation, as well as interdiffusion of elements with the substrate alloy. The coating system can separate from the substrate exposing the underlying superalloy component to damage from the hot gasses.

In particular, the squealer tip is the most difficult location to cool in a turbine blade. The squealer tip is located away from the convection cooling in the center of the blade, and the complex aerodynamic flow field near the squealer tip makes film cooling very inefficient. This inefficient cooling results in tip deterioration much earlier than desired, and requires tip repairs after relatively short time in-service to recover the tip clearance for better turbine efficiency.

As described above, to be more effective in permitting the attainment of higher engine operating temperatures, a TBC requires active cooling on the backside of the region being cooled. A TBC has not been considered for use in the squealer tip region or airfoils partly because of physical constraints and partly because no backside cooling was available to take advantage of the capabilities of the TBC by removing heat, thereby preventing a build-up of temperature in this region. During the airfoil manufacturing process, to prevent application of TBC coating in this area, the squealer tip and cap have usually been masked during the TBC coating process. However, recently, in order to reduce the manufacturing costs associated with the time consuming process of masking, the TBC coating application has been extended to cover the squealer tip, thus avoiding the masking process. The consequence of the presence of the TBC in this region has been that the higher temperatures experienced in this region because of a lack of cooling causes the TBC to spall from the backside of the squealer tip region after several cycles of engine operation, resulting in the same general configuration that occurs when masking is performed to prevent the deposition of the TBC. However, since it has become routine to apply a TBC to this region, it would therefore be advantageous to take advantage of the presence of the TBC by further improving squealer tip cooling by intentionally incorporating an effective TBC coating system to extend squealer tip life, which can be accomplished by providing adequate cooling of the region.

What is needed are improved designs that will allow a turbine engine blade squealer tip to run at higher operating temperatures, thus improving engine performance without the need for additional cooling air for the blade. It is also desirable to have a system that can take advantage of the thermal insulation provided by TBC. The present invention fulfills this need, and further provides related advantages.

SUMMARY OF THE INVENTION

The present invention provides a method for cooling the squealer tip region of a high pressure turbine blade used in a gas turbine engine comprising the steps of channeling apertures in a substrate to a diameter sufficient to allow passage of cooling fluid from a cooling fluid source; applying a sufficiently thick bond coat to the substrate such that the bond coat partially fills the apertures; applying a porous TBC layer to the bond coat, such that the TBC partially or completely fills the apertures; and applying a dense ceramic layer that is more dense than the porous TBC layer on top of the porous TBC layer. Optionally, conventional TBC can be applied on the concave (pressure side) and convex (suction side) of the airfoil surface.

In this manner, cooling fluid passes from a cooling fluid source through a channel aperture adjacent to the squealer tip into the porous TBC. Because the channel aperture is filled with porous TBC material, cooling fluid flows through the porous passageways into the porous TBC layer, continuing to flow between the bond coat and the dense coat, exiting to the squealer tip or any locations inside the tip cavity. In this manner, cooling fluid is directed to the squealer tip, previously unobtainable using known methods.

The present invention further comprises both the cooled blade and squealer tip region formed by the foregoing methods and the blade and squealer tip with the ceramic layers for cooling the squealer tip.

One advantage of the present invention is that the passageways provide a plurality of tortuous routes, whereby the increased density of the TBC in the dense outer layer having reduced porosity provides a resistance to flow of the cooling fluid and effectively causes the cooling fluid to more efficiently spread through the porous TBC before exiting at the outer surface.

Another advantage of the present invention is that the multi-layered TBC system forms cooling paths which allow cooling air from the interior of the blade to flow from tip holes adjacent to the squealer tip into the porous ceramic layer flowing between the bond coat and the dense coat, thereby flowing to the tip or any locations inside the tip cavity, providing efficient active convection cooling for both the squealer tip substrate and the bond coat by allowing heat to be removed from the squealer tip.

By removing heat from this region, the integrity of the bond coat can be maintained at higher engine firing temperatures, resulting in a more efficient usage of cooling fluid than that of the prior art to achieve a higher turbine engine efficiency and performance while improving squealer tip service life.

Still another advantage of the present invention is that the cooling channel exit apertures, being at least partially filled with porous TBC, have more flow resistance than open apertures and, therefore, provide a more uniform cooling flow distribution compared to unfilled conduits that transfer the same amount of cooling fluid, resulting in more efficient heat transfer.

Other features and advantages of the present invention will be apparent from the following more detailed description of the preferred embodiment, taken in conjunction with the accompanying figures which illustrate, by way of example, the principles of the invention.

DETAILED DESCRIPTION OF THE INVENTION

Substrate materials often used in turbine parts or airfoils for aircraft engines and power generation equipment may include nickel, cobalt, or iron based superalloys. The alloys may be cast or wrought superalloys. Examples of such substrates are GTD-111, GTD-222, Rene' 80, Rene' 41, Rene' 125, Rene' 77, Rene' N4, Rene' N5, Rene' N6, 4$^{th}$ generation single crystal superalloy, MX-4, Hastelloy X, and cobalt-based HS-188.

Figure 1:
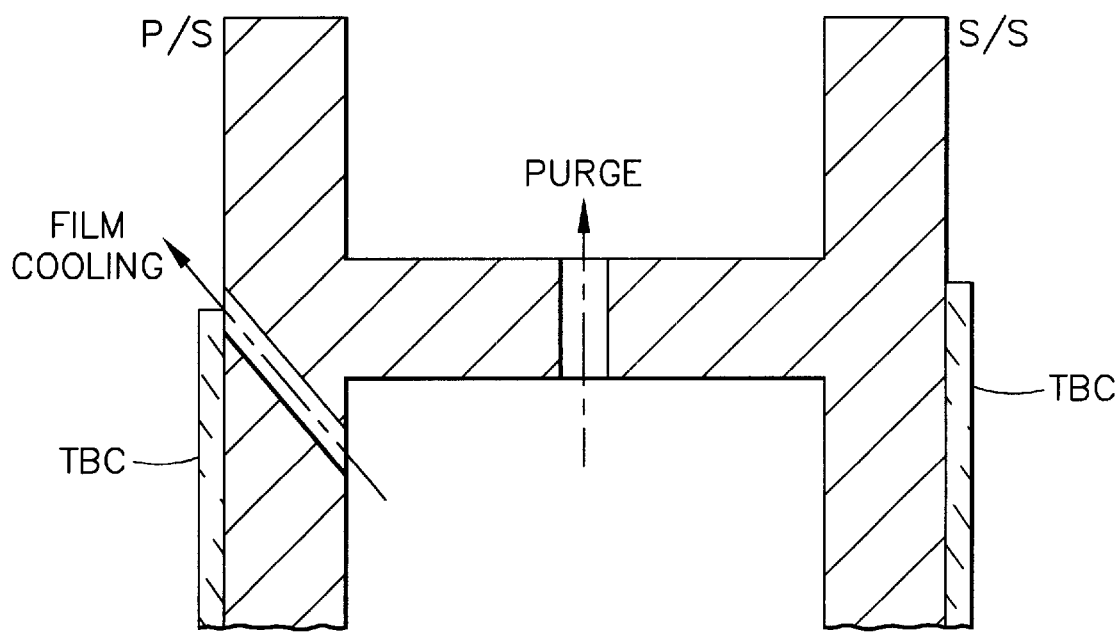
FIG. 1 is a representation of a form of existing art cooling of a turbine blade tip.
Figure 2:
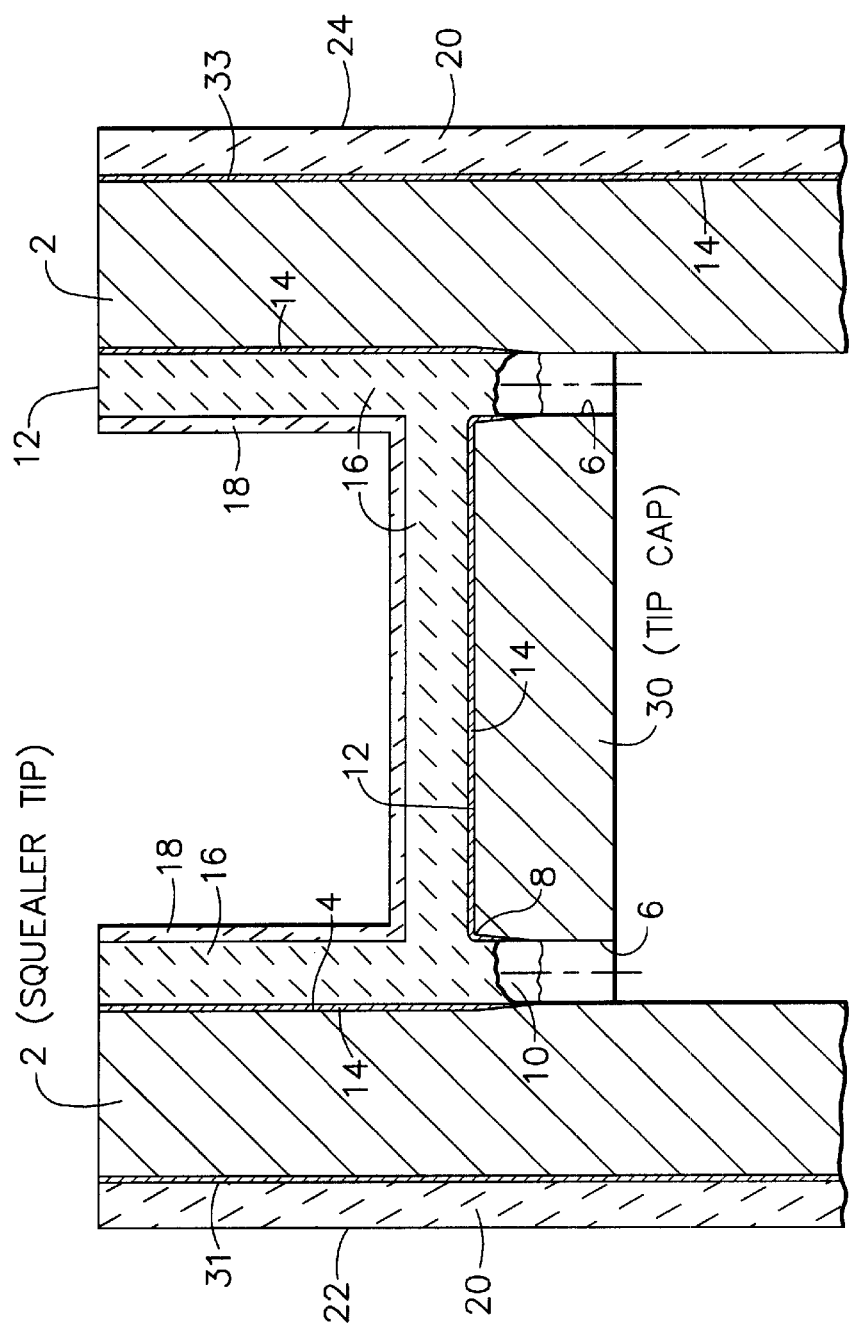
FIG. 2 is a representation of a form of the multi-layer ceramic coating of the present invention.

As shown in FIG. 1, a known squealer tip design utilizes cavity purge holes through the tip cap and pressure side film cooling holes that do not permit cooling fluid to flow to the squealer tip. The squealer tip and tip cap do not include state-of-the-art insulation such as thermal barrier coating systems, as the available cooling methods are inadequate to remove heat from these portions of the airfoil. The method of the present invention results in, for example, the airfoil blade tip shown in FIG. 2, which provides convection cooling and permits an effective use of well-known insulation. Optionally, TBC coating may be applied to either the pressure side, the suction side or both sides as well as to the tip cap.

A plurality of small channels 6, having a cross-sectional area equivalent to that obtained from a circular hole having a diameter of from about 0.004" to about 0.020", and preferably from a circular hole having a diameter of from about 0.004" to about 0.008", the cross-section having a preselected configuration, preferably a substantially circular cross-section, are drilled, such as by laser beam, electrical discharge machining (EDM), electrochemical machining (ECM) or electrostream (ES) machining, through tip cap 30 to provide communication to the interior of the blade. The channels may assume other convenient configurations, such as substantially rectantangular or substantially triangular. The final configuration is not critical, as any arcuate configuration of an appropriate area is satisfactory. Channels 6 may continue adjacent to the squealer tip wall 4 substantially perpendicular to tip cap 30. Alternatively, channels 6 may be cast into tip cap 30 and grooves may be cast along squealer tip wall 4. Because of the small size of the channels 6 and the physical effects of the drilling on the material, it is difficult to maintain the true or preselected cross-sectional configuration, due to localized recast metal. For example, when the preferred circular cross section is fabricated into tip cap 30 and along adjacent squealer tip wall 4, it is not uncommon for the cross section locally to be oval or elliptical. A first channel end 8 terminates at an exit orifice 10 at a surface 12 of tip cap 30. A second end (not shown) of channel 6 provides a fluid communication to the cooling circuits (not shown) contained internally within the turbine engine blade, generally located below tip cap 30 in FIG. 2.

A bond coat 14 is then formed on tip cap 30 and squealer tip 2, include squealer tip walls 4 and optionally on squealer tip pressure side wall 31 and optionally on suction side (backside) wall 33. The bond coat may be a diffusion aluminide bond coat, such as a NiAl or PtAl bond coat or combinations thereof, or it may be an additive bond coat of NiAl or Pt Al applied by well established techniques, for example, CVD, VPA and PACH. Alternatively, the bond coat 14 may be a MCrAl(X) additive layer where M is an element selected from the group consisting of Fe, Co and Ni and combinations thereof and (X) is an element selected from the group of gamma prime formers, solid solution strengtheners, consisting of, for example, Ta, Re and reactive elements, such as Y, Zr, Hf, Si, and grain boundary strengtheners consisting of B, C and combinations thereof. The MCrAl (X) is applied in the traditional manner using well-known techniques, for example, physical vapor deposition (PVD) processes such as electron beam (EB), ion-plasma deposition, or sputtering, and deposition temperatures can be 1600° F. or higher. Thermal spray processes such as air plasma spray (APS), low pressure plasma spray (LPPS) or high velocity oxyfuel (HVOF) spray can also be used. The channels through tip cap 30 may be masked as is well known in the art to prevent the holes from being filled by the applied bond coat metal, if there is such a concern.

Bond coat 14 is formed to a thickness of about 0.0005" to about 0.010", preferably about 0.002" in thickness. As discussed in the above referenced co-pending applications, when the bond coat 14 is applied after the channels 6 have been drilled, bond coat 14 may partially close the exit orifices 10 of the channels 6. When bond coat 14 is applied first, followed by drilling of the small channels 6, the potential problem of hole blockage by bond coat 14 is eliminated. However, application of bond coat 14 after drilling of channels 6 is preferred, to allow bond coat 14 to partially penetrate along the walls channels 6, thereby increasing adherence of the subsequently applied ceramic top coat. Application of bond coat 14 after drilling of channels 6 also provides a protective environmental coating over the exposed substrate forming the internal walls of channel 6.

After channels 6 are generated and the bond coat 14 is applied, a generally porous TBC top coat 16 comprised of a porous yttria-stabilized zirconia (YSZ), typically including about 7–9% by weight yttrium, is applied on top of the bond coat 14. The porous YSZ structure can be achieved, for example, by applying the YSZ using PVD or plasma spray processes at temperatures in the range of 1600°–1800° F., which are lower than traditional YSZ application temperatures of 1825°–2150° F. Other methods may be utilized independent of the reduced temperature techniques or in combination with the reduced temperature techniques to achieve the porous YSZ structure. Alternatively, the porous ceramic thermal barrier layer may be a porous $Al_2O_3$, or other suitable oxides, such as, for example, zirconia modified by other refractory oxides such as oxides formed from Group IV, V and VI elements, or oxides modified by Lanthanide (Rare Earth) Series elements such as La, Nd, Gd, Yb or other elements in the series.

The porous TBC layer 16 having a first preselected porosity is applied to a thickness of at least about 0.003", preferably about 0.010". When about 0.010" of porous TBC layer 16 is applied, the channels 6 can be completely filled with TBC 16, while reduced thicknesses are applied when the object or purpose is to only partially fill exit orifice 10 of channels 6 with porous TBC material. A porous TBC layer 16 applied to a thickness greater than about 0.010" typically will completely span exit orifice 10 of channels 6.

Applied on top of the porous TBC layer 16 is a dense, relative to the porous TBC layer 16, ceramic layer 18 having a second, preselected porosity or density. The dense ceramic layer 18 may be, for example, YSZ, a thin layer of $Al_2O_3$, or any other suitable oxide, for example, zirconia modified by other refractory oxides, such as oxides formed from Group IV, V and VI elements, or oxides modified by Lanthanide (Rare Earth) Series elements such as La, Nd, Gd, Yb or other elements in the series. Such oxide layers may be deposited by physical deposition processes such as EB-PVD. The method for forming a layer of a suitable oxide over dense ceramic layer 18 is not restricted to PVD techniques, and other suitable processes also may be employed. The dense ceramic layer is applied to a thickness of about 0.002" to about 0.020". Although it is possible to provide a thicker layer of dense ceramic, thicker layers are undesirable because of the added weight. Preferably, the dense TBC layer is applied to a thickness in the range of 0.002"–0.003".

When bond coat has previously been applied, a conventional TBC layer 20 optionally may be applied to wall 31 along concave (pressure side) 22 and/or wall 33 along convex (suction side) 24 airfoil surfaces using deposition techniques similar to those used to apply the porous layer 16. This TBC may have a third preselected porosity or density. The density of this layer can be varied as desired using well known methods for varying deposition densities such as by varying the deposition temperature. The beneficial cooling effects of the present invention extend the life of the TBC by creating increased adherence of the pressure and suction side TBC to the airfoil component due to introduction of cooling of the airfoil in these regions, which heretofore has not been incorporated into such blade designs.

Because the porous TBC layer 16 is processed to have a predetermined porosity, cooling fluid, for example, cooling air, is able to flow through the channels 6 and spread inside the porous TBC layer 16. The dense ceramic layer 18 is much denser than the porous TBC, inhibiting through passage of cooling fluid. Therefore, the porous TBC layer 16 located between the bond coat 14 and the dense ceramic layer 18 effectively forms a cooling channel directing the flow of cooling air from the channel exit orifice 10 to the squealer tip 2. During engine operation, cooling air flows between the bond coat 14 and the dense ceramic layer 18, and exits to the tip 2 or any locations inside the tip cavity, eventually discharging into the gas stream. In this manner, the TBC system has both cooling and insulation purposes. Because the composition and/or microstructure of the dense ceramic TBC layer 18 is different from the porous TBC layer 16, its structure may be controlled as required for specific applications, for example, for "hotspots" located on the engine component.

In operation, the cooling fluid passes into the cooling channels 6 from the cooling circuit (not shown). As it reaches the exit orifice 10, which is partially filled by the bond coat 14 and partially or completely filled by the porous TBC layer 16, the cooling fluid is diverted into the tortuous porosity that forms passageways for the cooling fluid. As the cooling fluid traverses through the porous TBC layer 16 to the dense ceramic layer 18, it encounters more resistance than it would in passing through an unobstructed orifice, and thus is further diverted across a larger volume of airfoil as the fluid seeks the path of least resistance through the porous TBC. The dense outer ceramic layer 18 provides substantial resistance to the cooling fluid, thereby preventing throughpassage of the cooling fluid external to the airfoil. Instead, dense ceramic layer 18 assists in directing the cooling fluid along squealer tip walls 4 where it can readily exit into the gas stream adjacent squealer tip 2. As the cooling fluid traverses through the passageways, it removes heat from the adjoining TBC through which it passes. The cooling fluid, which is at an elevated temperature, ultimately is expelled, typically into the gas stream. In this manner, the bond coat 14 is kept at a reduced temperature through convection cooling. Utilizing the convection cooling techniques and insulation provided by the present invention in portions of airfoils that have not previously included these features, a gas turbine engine is able to be operated at temperatures hotter than those presently employed, with a resulting increase in engine efficiencies.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A cooling system for cooling of the squealer tip region of a high pressure turbine airfoil used in a gas turbine engine comprising:

a superalloy tip cap;

a superalloy squealer tip extending outward in an engine radial direction from the superalloy tip cap into a hot gas stream of the engine;

at least one channel having a first and second end, the first end terminating in an exit orifice located on a surface of the tip cap, the second end connecting to a cooling circuit located within a substrate, wherein the at least one channel has a diameter to permit an effective flow of cooling fluid;

a bond coat having a thickness of about 0.0005" to about 0.010" applied to the tip cap surface, wherein the bond coat partially fills the exit orifice of the at least one channel;

a layer of porous thermal barrier coating (TBC) having a first amount of predetermined porosity applied over the bond coat such that the porous TBC substantially covers the remainder of the exit orifice of the at least one channel; and, a layer of dense ceramic TBC applied to the porous layer of TBC, wherein the dense TBC layer has an amount of predetermined porosity so that it is less porous than the porous TBC layer.

2. The cooling system of claim 1 wherein the porous TBC partially fills the exit orifice of the at least one channel.

3. The cooling system of claim 1 wherein the porous TBC completely fills the exit orifice of the at least one channel.

4. The cooling system of claim 1 wherein the at least one channel has a cross-sectional area equivalent to a diameter of about 0.004" to about 0.020".

5. The cooling system of claim 1 wherein the bond coat has a thickness of about 0.002".

6. The cooling system of claim 1 wherein the bond coat is an aluminide selected from the group consisting of NiAl and PtAl and combinations thereof.

7. The cooling system of claim 1 wherein the bond coat is a MCrAl(X) where M is an element selected from the group consisting of Fe, Co and Ni and X is an element selected from the group consisting of gamma prime formers, solid solution strengtheners, grain boundary strengtheners, reactive elements and combinations thereof.

8. The cooling system of claim 1 wherein the layer of porous TBC having a first amount of predetermined porosity has a thickness of at least about 0.003" so that the porous TBC fills the remainder of the exit orifice and a cooling fluid can pass substantially unrestricted through the porous layer.

9. The cooling system of claim 1 wherein the layer of porous TBC having a first amount of predetermined porosity has a thickness of from about 0.003" or less so that the exit orifice is not completely filled and a cooling fluid can pass substantially unrestricted through the porous layer.

10. The cooling system of claim 1 wherein the dense ceramic layer is selected from the group consisting of yttria-stabilized zirconia, zirconia modified by refractory oxides, $Al_2O_3$, oxides formed from Group IV, V and VI elements and oxides modified by Lanthanide Series elements.

11. The cooling system of claim 1 further including a cooling fluid supplied from the cooling circuit, whereby the cooling fluid is diffused and flows through the layer of porous TBC.

12. The cooling system of claim 1 further including at least one opening extending through the porous TBC layer and opening onto an outer surface.

13. The cooling system of claim 1 further including a TBC layer applied to at least one of the group consisting of a pressure side and a suction side of an airfoil.

14. The cooling system of claim 1 wherein the dense ceramic layer is applied to a thickness of from about 0.002"–0.020".

15. The cooling system of claim 12 wherein the dense ceramic layer is applied to a thickness of from about 0.002"–0.003".

16. A method for cooling of the squealer tip region of a high pressure turbine blade used in a gas turbine engine comprising the steps of:

channeling apertures having a diameter of about 0.004" to about 0.020" in a tip cap of the turbine blade to allow passage of cooling fluid from a cooling fluid source to a surface of the tip cap;

forming a bond coat having a thickness in the range of about 0.0005" to about 0.010" to an outer surface of the tip cap and at least adjacent squealer tip walls such that the bond coat coats walls of the apertures formed in substrate material near exit orifices at the tip cap surface;

applying a porous thermal barrier coating (TBC) layer having a first preselected density having a thickness of at least about 0.003" over the formed bond coat, such that the TBC covers the tip cap outer surface and adjacent squealer tip walls and at least partially fills the remainder of the exit orifices;

applying a dense ceramic layer over the porous TBC layer, wherein the dense ceramic layer has a second preselected density that is more dense than the first preselected density of the porous TBC layer; and, passing cooling fluid from the cooling fluid source through the apertures in the tip cap, into and through the porous TBC layer.

17. The method of claim 16 wherein the apertures are channeled in the tip cap by laser drilling.

18. The method of claim 16 wherein the apertures have a substantially circular cross-section.

19. The method of claim 16 wherein the bond coat is applied a thickness of about 0.002".

20. The method of claim 16 further comprising the step of forming openings extending through the porous TBC layer and opening onto an outer surface.

21. The method of claim 16 further comprising the step of applying a TBC layer to at least one of the group consisting of a pressure side and a suction side of an airfoil.

22. A cooling system for cooling of the squealer tip surface region of a high pressure turbine blade used in a gas turbine engine formed by the method of claim 16.

* * * * *